United States Patent [19]
Ngoc et al.

[11] Patent Number: 4,931,974
[45] Date of Patent: Jun. 5, 1990

[54] SIXTEEN-BIT PROGRAMMABLE PIPELINED ARITHMETIC LOGIC UNIT

[75] Inventors: Danh Le Ngoc, Saratoga; John R. Mick, Los Altos Hills, both of Calif.

[73] Assignee: Integrated Device Technology, Inc., Santa Clara, Calif.

[21] Appl. No.: 304,069

[22] Filed: Jan. 30, 1989

[51] Int. Cl.$^5$ .............................................. G06F 7/00
[52] U.S. Cl. .................................................. 364/736
[58] Field of Search ............................... 364/736, 726

[56] References Cited

U.S. PATENT DOCUMENTS 4,760,517  7/1988  Miller et al. ......................... 364/736
4,760,544  7/1988  Lamb .................................. 364/736

OTHER PUBLICATIONS

K. Kloker, "The Motorola DSP56000 Digital Signal Processor", *IEEE Micro*, Dec. 1986, pp. 29-48.
G. Frantz et al., "The Texas Instruments TMS320C25 Digital Signal Microcomputer", Dec. 1986, *IEEE Micro*, pp. 10-28.
J. Lin et al., "High Performance Fixed-Point Fast Fourier Transform Processor", *Integrated Device Technology, Inc. Application Note*, Oct. 1988, pp. 1-15.

*Primary Examiner*—Gary V. Harkcom
*Assistant Examiner*—Long T. Nguyen
*Attorney, Agent, or Firm*—Thomas E. Schatzel

[57] ABSTRACT

For use in calculating discrete, fast fourier transformations, an arithmetic logic unit includes a number of multiplexers and registers, which, in combination, form a configurable pipeline, register ("A"), that functions as a four-deep pipeline register, as two, two-deep, pipeline registers, or as four separate registers, to latch and "delay" the parameter represented by the state of signals externally developed on a "DA" bus; the combination of a funnel shifter, a merge logic unit and a multiplexer; a unit for "bit-reverse order" addressing; and a unit for "rounding off" certain results.

9 Claims, 2 Drawing Sheets

SIXTEEN-BIT PROGRAMMABLE PIPELINED ARITHMETIC LOGIC UNIT

TECHNICAL FIELD

The present invention relates to integrated circuit type microprocessors generally and more particularly to an arithmetic logic unit having a configurable, pipeline register.

BACKGROUND ART

Prior art type microprocessors are less than ideally suited for certain kinds of applications. Consider, for example, some of the operations performed in calculating a discrete, fast Fourier transformation (FFT) of the type commonly used in spectrum analysis. In what is commonly referred to as a "butterfly" certain operations are performed (four multiplications usually performed in parallel) followed by four additions or subtractions (also usually performed in parallel) during a total of at least two clock cycles on a first parameter before the first parameter is combined with (added to or subtracted from) a second parameter. Fetching the two parameters from memory at different times is undesirable in that it is inconsistent with high speed operations and it requires additional logic. Holding the second parameter, such as by holding a clocking signal, is undesirable. This is because it is inconsistent with high speed operation, requires additional logic, and requires the use of multiple clocks. Also, to reduce the number of computations required, certain discrete, fast Fourier transformation operations require that certain parameters (samples) be addressed in what is commonly referred to as a "bit-reverse order". Further, the "rounding off" of certain results is required in order to maintain accuracy. For additional information on discrete, fast Fourier transformation operations, the reader is referred to the application note by Julie Lin and Danh Le Ngoc which is designated AN-XX High Performance Fixed Point Fast Fourier Transformation Processor (10-14-1988) by Integrated Device Technology, Inc.

The prior art type device which is designated 7381 by Integrated Device Technology, Inc., L4C381 by Logic Devices, Inc., and S614381 by Gould, Inc., includes an "A" and a "B" input register, an "A" multiplexer configured with one set of multiplexer data inputs connected to the data inputs of the "A" register and with another set of multiplexer data inputs connected to the data outputs of the "A" register; a "B" multiplexer configured with one set of multiplexer data inputs connected to the data inputs of the "B" register and with another set of multiplexer data inputs connected to the data outputs of the "B" register; an "R" multiplexer, configured with one set of multiplexer data inputs connected to the data outputs of the "A" multiplexer, and an "S" multiplexer configured with one set of multiplexer data inputs connected to the data outputs of the "B" multiplexer. In addition, the device includes a 16-bit arithmetic logic unit configured with one set of unit data (operand) inputs connected to the data outputs of the "R" multiplexer and with another set of unit data (operand) inputs connected to the data outputs of the "S" multiplexer. Further, the device includes an "F" output register configured with the register data inputs connected to the data outputs of the arithmetic logic unit, an "F" multiplexer configured with one set of multiplexer data inputs connected to the data inputs of the "F" register and with another set of multiplexer data inputs connected to the data outputs of the "F" register, and a tri-state output driver unit configured with the unit data inputs connected to the data outputs of the "F" multiplexer. Unfortunately, the device lacks means for "delaying" a parameter, means for "bit-reverse order" addressing, and means for "rounding off" certain results.

DISCLOSURE OF THE INVENTION

It is therefore an object of the present invention to provide an arithmetic logic unit which employs means for temporarily "delaying" an input parameter.

Another object of the present invention is to provide an arithmetic logic unit employing means for "bit-reverse order" addressing.

Another object of the present invention is to provide an arithmetic logic unit employing means for "rounding off" certain results.

Still another object of the present invention is to provide an arithmetic logic unit which is relatively fast.

Briefly, the presently preferred embodiment of an arithmetic logic unit in accordance with the present invention includes a number of multiplexers and registers, which, in combination, form a configurable, pipeline, register ("A"), that functions as a four-deep pipeline register; as two, two-deep, pipeline registers; or as four separate registers, to latch the state of signals externally developed on a "DA" bus to "delay" the parameter they represent. In addition, the unit includes a "B" register for latching the state of signals externally developed on a "DB" bus; an "A" multiplexer for developing on an "R" bus signals representing either the "A" register signals, the "B" register signals, the "DA" bus signals, the "DB" bus signals, or signals developed on a "FB" bus; a "B" multiplexer for developing on an "S" bus signals representing either the "B" register signals, the "DA" bus signals, the "DB" bus signals, or signals developed on the "FB" bus; an "R" multiplexer; an "S" multiplexer; and an arithmetic logic unit coupled to the "R" and "S" busses by the "A" and "B" multiplexers. Further, the unit includes the combination of a funnel shifter, a merge logic unit, and a multiplexer, the combination being connected to the "R" and "S" busses. Finally, in an output portion, the unit includes four multiplexers; an "F1", an "F2", and an "ACC" register; a bit reversing unit; a rounding unit; a shifter; and a tri-state output driving unit. The first output portion multiplexer is configured to selectively couple signals developed either by the arithmetic logic unit or the funnel shifter/merge logic unit multiplexer to the output portion registers; and, the second output portion multiplexer is configured to selectively couple signals developed by the output portion registers or developed on a "YO" bus to the "FB" bus. The third output portion multiplexer is configured to selectively couple signals developed by the output portion registers "F1" or "F2" or the first output portion multiplexer to the bit reversing unit, the rounding unit, and the shifter; and, the fourth output portion multiplexer is configured to selectively couple signals developed by the bit reversing unit, the rounding unit, the shifter, or the third output portion multiplexer to the output driving unit, which develops signals on the "YO" bus.

These and other objects of the present invention will no doubt become apparent to those skilled in the art after having read the detailed description of the presently preferred embodiment of the present invention which is illustrated in the figures of the drawing.

BEST MODE FOR CARRYING OUT THE INVENTION

Figure 1:
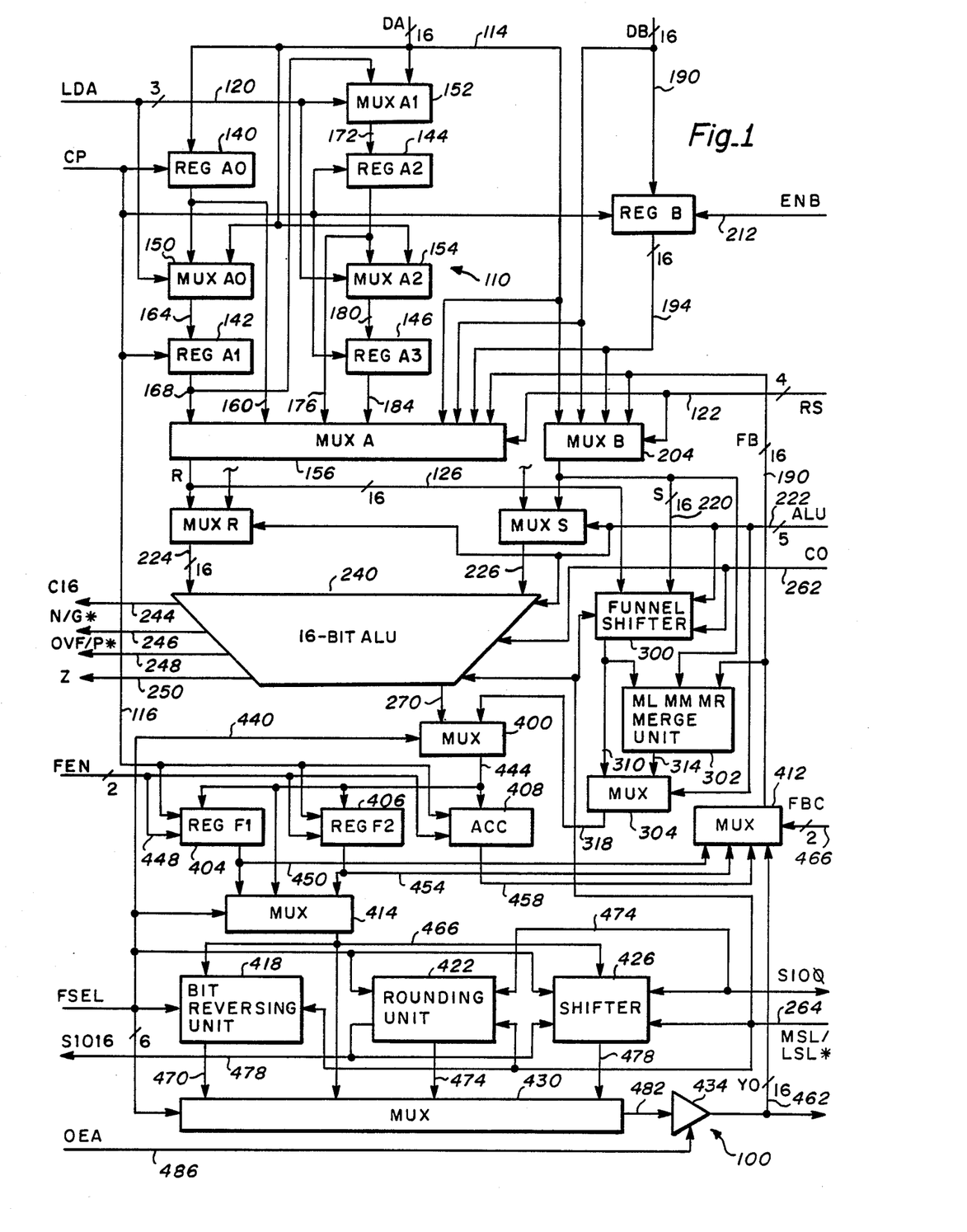
FIG. 1 is a block diagram illustrating the presently preferred embodiment of an arithmetic logic unit in accordance with the present invention.

Illustrated in FIG. 1 of the drawing generally designated by the number 100 is the presently preferred embodiment of an arithmetic logic unit (ALU) (system) in accordance with the present invention. Unit 100 is shown to include a number of multiplexers and registers, which, in combination, form a configurable, pipeline, register, that is generally designated 110. Register 110 has data inputs, which are connected to a 16-line "DA(0-15)" bus, that is designated 114. In addition, register 110 has clock inputs, which are connected to a "CP" (clock) line, that is designated 116. Further, register 110 has load-address (configuration) inputs, connected to a 3-line "LDA(0-2)" bus 120, and output-select (configuration) inputs, connected to a 4-line "RS(0-3)" bus 122. Finally, register 110 has data outputs, connected to a 16-line "R" bus 126. Responsive to the state of load-addressing signals externally developed on "LDA" bus 120 and the state of output-selecting signals externally developed on "RS" bus 122, register 110 functions as a four-deep pipeline register, as two, two-deep, pipeline registers, or as four separate registers, to latch the state of signals externally developed on "DA" bus 114 to "delay" the parameter they represent.

More specifically, register 110 includes four, similar, 16-bit, D-type, edge-triggered (flip-flop) registers, which are respectively designated 140, 142, 144, and 146, and four multiplexers, which are respectively designated 150, 152, 154, and 156. Registers 140, 142, 144, and 146 are each of the type which, at each of a series of times marked by a signal developed at the register clock input, latch the state of each of 16 signals each developed at the corresponding one of the 16 register data inputs and which develop at the 16 register data outputs signals each of which has a respective one of the latched states. Register 140 ("A0") is configured, with the 16 register data inputs each connected to a respective line of the 16 lines of "DA" bus 114, with the register clock input connected to "CP" line 116, and with the 16 register data outputs each connected to a respective line of a 16-line bus 160. Multiplexer 150 ("A0") is of the type which has a first set of 16 (A) data inputs, a second set of 16 (B) data inputs, a number of select (control) inputs, and a set of 16 data outputs. Further, "A0" multiplexer 150 is of the type which is operative to develop at the 16 multiplexer data outputs signals the states of which correspond either each to the state of a respective one of 16 signals each developed at the corresponding one of the first set of 16 multiplexer (A) data inputs or each to the state of a respective one of 16 signals each developed at the corresponding one of the second set of 16 multiplexer (B) data inputs, as determined (selected) by the state of signals developed on the multiplexer select (control) inputs. "A0" Multiplexer 150 is configured, with the first set of 16 multiplexer (A) data inputs each connected to a respective one of the 16 lines of bus 160, with the second set of 16 multiplexer (B) data inputs each connected to a respective one of the 16 lines of "DA" bus 114, with the multiplexer select (control) inputs connected to lines of "LDA" bus 120, and with the set of 16 multiplexer data outputs each connected to a respective line of a 16-line bus 164.

Register 142 ("AI") is configured, with the 16 register data inputs each connected to a respective line of the 16 lines of bus 164, with the register clock input connected to "CP" line 116, and with the 16 register data outputs each connected to a respective line of a 16-line bus 168. Multiplexer 152 ("AI"), which is similar to "A0" multiplexer 150, is configured, with the first set of 16 multiplexer (A) data inputs each connected to a respective one of the 16 lines of bus 168, with the second set of 16 multiplexer (B) data inputs each connected to a respective one of the 16 lines of "DA" bus 114, with the multiplexer select (control) inputs connected to lines of "LDA" bus 120, and with the set of 16 multiplexer data outputs each connected to a respective line of a 16-line bus 172. Similarly, register 144 ("A2") is configured, with the 16 register data inputs each connected to a respective line of the 16 lines of bus 172, with the register clock input connected to "CP" line 116, and with the 16 register data outputs each connected to a respective line of a 16-line bus 176. Multiplexer 154 ("A2"), which is, also, similar to "A0" multiplexer 150, is configured, with the first set of 16 multiplexer (A) data inputs each connected to a respective one of the 16 lines of bus 176, with the second set of 16 multiplexer (B) data inputs each connected to a respective one of the 16 lines of "DA" bus 114, with the multiplexer select (control) inputs connected to lines of "LDA" bus 120, and with the set of 16 multiplexer data outputs each connected to a respective line of a 16-line bus 180. Finally, register 146 ("A3") is configured, with the 16 register data inputs each connected to a respective line of the 16 lines of bus 180, with the register clock input connected to "CP" line 116, and with the 16 register data outputs each connected to a respective line of a 16-line bus 184.

The select (control) inputs of "A0" multiplexer 150, "A1" multiplexer 152, and "A2" multiplexer 154, which are connected to the three lines of "LDA" bus 120, are configured such that responsive to the state of signals externally developed on "LDA" bus 120, the multiplexers are operative to couple the signals as follows:

| "LDA" BUS 120 SIGNAL STATES | | | MULTIPLEXER |
|---|---|---|---|
| LDA2 | LDA1 | LDA0 | LOAD FUNCTION |
| 0 | 0 | 0 | Load DA into A0 |
| 0 | 0 | 1 | Load DA into A1 |
| 0 | 1 | 0 | Load DA into A2 |
| 0 | 1 | 1 | Load DA into A3 |
| 1 | 0 | 0 | Load DA into A0 & shift A0 → A1 → A2 → A3 |
| 1 | 0 | 1 | Load DA into A0 & shift A0 → A1 |
| 1 | 1 | 0 | Load DA into A2 & shift A2 → a3 |
| 1 | 1 | 1 | Hold. |

Multiplexer 156 ("A") is of the type which has eight set of 16 data inputs, a number of select (control) inputs, and a set of 16 data outputs. Further, "A" multiplexer 156 is of the type which is operative to develop at the 16 multiplexer data outputs signals the states of which correspond each to the state of a respective one of a set of 16 signals developed at a selected one of the eight sets of 16 data inputs, the set of data inputs selected being determined by the state of signals developed on the multiplexer select (control) inputs. "A" Multiplexer 156 is configured, with (the first) one of the sets of 16 multiplexer data inputs connected, each input to a respective one of the 16 lines of bus 168, with (the second) one of the sets of 16 multiplexer data inputs connected, each input to a respective one of the 16 lines of bus 160, with (the third) one of the sets of 16 multiplexer data inputs connected to the 16 lines of bus 176, with (the fourth) one of the sets of 16 multiplexer data inputs connected to the 16 lines of bus 184, and with (the fifth) one of the sets of 16 multiplexer data inputs connected to the 16 lines of "DA" bus 114. Another (sixth) one of the sets of 16 "A" multiplexer 156 data inputs is connected, each input to a respective line of a 16-line "DB(0-15)" bus 190. Still another (seventh) one of the sets of 16 "A" multiplexer 156 data inputs is connected, each input to a respective line of a 16-line "feed-back" "FB" bus 192. The remaining (eighth) one of the sets of 16 "A" multiplexer 156 data inputs is connected each input to a respective line of a 16-line "B" bus 194. The "A" multiplexer 156 select (control) inputs are connected to lines of "RS" bus 122; and, the set of 16 multiplexer data outputs are connected, each output to a respective line of the 16 lines of "R" bus 126.

Arithmetic logic unit 100 also includes another, 16-bit, D-type (flip-flop) register 200 and three more multiplexers, which are respectively designated 204, 206, and 208. Register 200 ("B"), which is similar to "A0" multiplexer 140, is configured, with the 16 register data inputs each connected to a respective line of the 16 lines of "DB" bus 190, with the register enable input connected to an "ENB" line 212, with the register clock input connected to "CP" line 116, and with the 1-6 register data outputs each connected to a respective line of the 16 lines of "B" bus 194. Multiplexer 204 ("B") is of the type which has four set of 16 data inputs, a number of select (control) inputs, and a set of 16 data outputs. Further, "B" multiplexer 204 is of the type which is operative to develop at the 16 multiplexer data outputs signals the states of which correspond each to the state of a respective one of a set of 16 signals developed at a selected one of the four sets of 16 data inputs, the set of data inputs selected being determined by the state of signals developed on the multiplexer select (control) inputs. "B" Multiplexer 204 is configured, with (the first) one of the sets of 16 multiplexer data inputs connected, each input to a respective one of the 16 lines of "DA" bus 114, with (the second) one of the sets of 16 multiplexer data inputs connected, each input to a respective one of the 16 lines of "DB" bus 190, with (the third) one of the sets of 16 multiplexer data inputs connected to the 16 lines of "B" bus 194, and with the remaining (fourth) one of the sets of 16 multiplexer data inputs connected to the 16 lines of bus "FB" 192. The "B" multiplexer 204 select (control) inputs are connected to lines of "RS" bus 122; and, the set of 16 multiplexer data outputs are connected, each output to a respective line of a 16-line "S" bus 220.

The select (control) inputs of "A" multiplexer 156 and "B" multiplexer 204, which are connected to the four lines of "RS" bus 204, are configured such that responsive to the state of signals externally developed on "RS" bus 120, the multiplexers are operative to couple the signals as follows:

| "RS" BUS 120 | | | | "R" BUS 126 | "S" BUS 220 |
|---|---|---|---|---|---|
| RS3 | RS2 | RS1 | RS0 | A SELECTION | B SELECTION |
| 0 | 0 | 0 | 0 | A0 | B |
| 0 | 0 | 0 | 1 | A1 | B |
| 0 | 0 | 1 | 0 | A2 | B |
| 0 | 0 | 1 | 1 | A3 | B |
| 0 | 1 | 0 | 0 | A0 | DB |
| 0 | 1 | 0 | 1 | A1 | DB |
| 0 | 1 | 1 | 0 | A2 | DB |
| 0 | 1 | 1 | 1 | A3 | DB |
| 1 | 0 | 0 | 0 | A0 | DA |
| 1 | 0 | 0 | 1 | A1 | DA |
| 1 | 0 | 1 | 0 | A2 | DA |
| 1 | 0 | 1 | 1 | A3 | DA |
| 1 | 1 | 0 | 0 | B | DA |
| 1 | 1 | 0 | 1 | DB | B |
| 1 | 1 | 1 | 0 | DA | DB |
| 1 | 1 | 1 | 1 | FB | DB. |

Multiplexer 206 ("R") is configured, with one set of 16 multiplexer data inputs connected, each input to a respective one of the 16 lines of "R" bus 126 and with another set of 16 multiplexer data inputs connected, each input to a low logic level potential ("0"). The "R" multiplexer 206 select (control) inputs are connected to lines of a 5-line "ALU(0-4)" bus 222; and, the set of 16 multiplexer data outputs are connected, each output to a respective line of a 16-line bus 224. Multiplexer 208 ("S") is configured, with one set of 16 multiplexer data inputs connected, each input to a respective one of the 16 lines of "B" bus 194, and with another set of 16 multiplexer data inputs connected, each input to a low logic level potential ("0"). The "S" multiplexer 208 select (control) inputs are connected to the lines of "ALU" bus 222; and, the set of 16 multiplexer data outputs are connected, each output to a respective line of a 16-line bus 226.

Arithmetic logic unit 100 further includes a 16-bit, full carry look-ahead, arithmetic logic unit (ALU) 240. Arithmetic logic unit 240 is configured with the first set of 16 unit operand inputs connected, each input to the respective line of the 16 lines of bus 224 and with the second set of unit operand inputs connected, each input to the respective line of the 16 lines of bus 226. In addition, the arithmetic logic unit 240 flag outputs are connected, the unit carry flag output to a "C16" line 244, the unit negative/generate flag output connected to a "N/G*" line 246, the unit overflow/propagate flag output connected to a "OVF/P*" line 248, and the unit zero flag output connected to a "Z" line 250. Further, the arithmetic logic unit 240 control inputs are connected, the four unit function selecting inputs each to a respective line of the four lines of "ALU" bus 222, the unit carry control input to a "CO" line 262, and the unit position control input to a "MSL/LSL*" line 264. Finally, the 16 arithmetic logic unit 240 data outputs are connected, each to a respective line of a 16-line bus 270. Arithmetic logic unit 240 is of the type which, responsive to the state of four signals externally developed on "ALU" bus 222, is operative to execute the following functions:

| ALU4 | ALU3 | ALU2 | ALU1 | ALU0 | FUNCTION |
|---|---|---|---|---|---|
| 0 | 0 | 0 | 0 | 0 | R + S + C |
| 0 | 0 | 0 | 0 | 1 | R OR S |
| 0 | 0 | 0 | 1 | 0 | R − S + C |
| 0 | 0 | 0 | 1 | 1 | S − R + C |
| 0 | 0 | 1 | 0 | 0 | R + C |

-continued

| ALU4 | ALU3 | ALU2 | ALU1 | ALU0 | FUNCTION |
|---|---|---|---|---|---|
| 0 | 0 | 1 | 0 | 1 | R* OR FB |
| 0 | 0 | 1 | 1 | 0 | R − ZERO + C |
| 0 | 0 | 1 | 1 | 1 | R* + C |
| 0 | 1 | 0 | 0 | 0 | R + FB + C |
| 0 | 1 | 0 | 0 | 1 | R OR FB |
| 0 | 1 | 0 | 1 | 0 | R − FB + C |
| 0 | 1 | 0 | 1 | 1 | FB − R + C |
| 0 | 1 | 1 | 0 | 0 | FB + S + C |
| 0 | 1 | 1 | 0 | 1 | R* OR S |
| 0 | 1 | 1 | 1 | 0 | FB − S + C |
| 0 | 1 | 1 | 1 | 1 | S − FB + C |
| 1 | 0 | 0 | 0 | 0 | R EXOR S |
| 1 | 0 | 0 | 0 | 1 | R AND S |
| 1 | 0 | 0 | 1 | 0 | R* AND S |
| 1 | 0 | 0 | 1 | 1 | R EXNOR S |
| 1 | 0 | 1 | 0 | 0 | R EXOR FB |
| 1 | 0 | 1 | 0 | 1 | R AND FB |
| 1 | 0 | 1 | 1 | 0 | R* AND FB |
| 1 | 0 | 1 | 1 | 1 | all one's + C |
| 1 | 1 | 0 | 0 | 0 | S + C |
| 1 | 1 | 0 | 0 | 1 | R AND S* |
| 1 | 1 | 0 | 1 | 0 | S* + C |
| 1 | 1 | 0 | 1 | 1 | S − ZERO + C |
| 1 | 1 | 1 | 0 | 0 | FB + C |
| 1 | 1 | 1 | 0 | 1 | R OR S* |
| 1 | 1 | 1 | 1 | 0 | FB − ZERO + C |
| 1 | 1 | 1 | 1 | 1 | FB* + C. |

Figure 2:
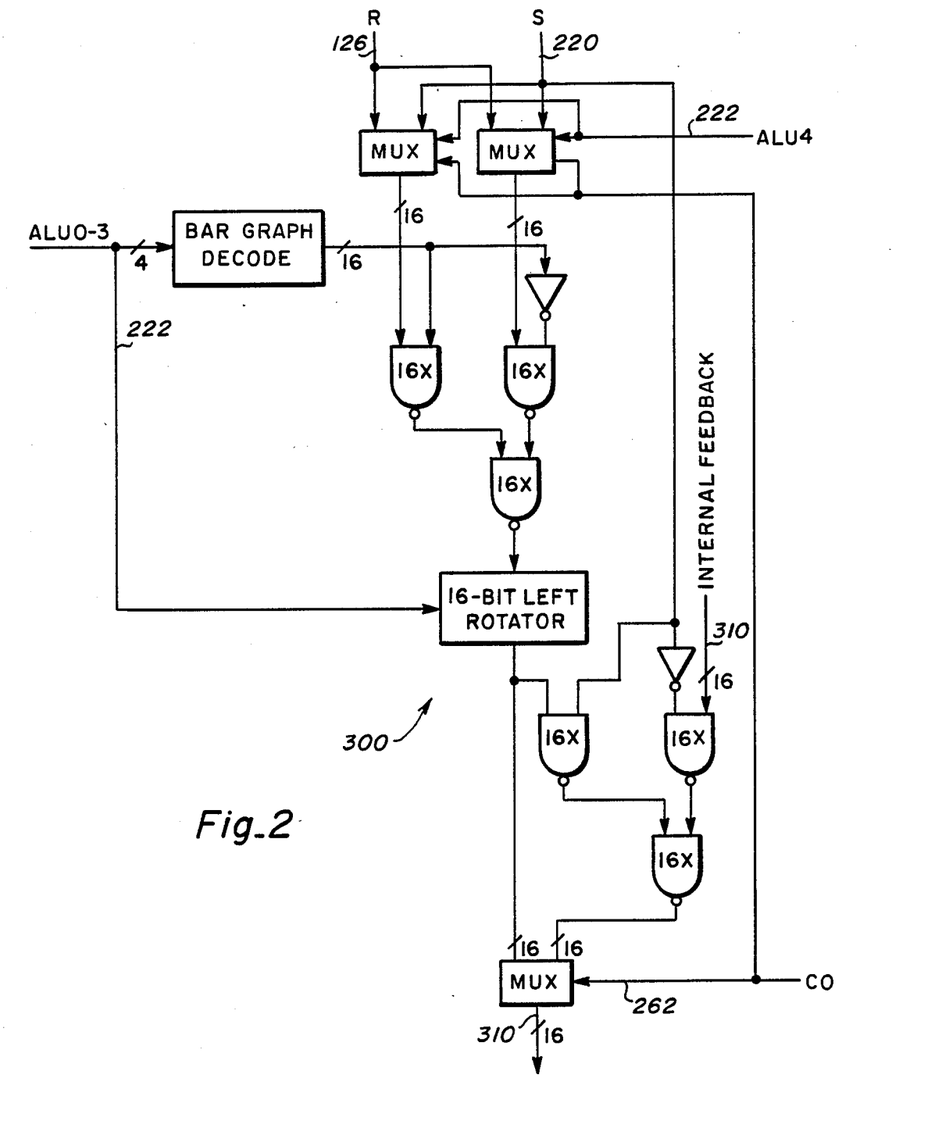
FIG. 2 is a block diagram further illustrating the funnel shifter, which is shown in FIG. 1.

Further, arithmetic logic unit 100 includes a funnel shifter 300, a merge logic unit 302, and a multiplexer 304. Funnel shifter 300 is configured with the set of 16 funnel shifter "R" inputs connected, each input to the respective line of the 16 lines of "R" bus 126 and with the set of funnel shifter "S" inputs connected, each input to the respective line of the 16 lines of "S" bus 220. In addition, the funnel shifter control inputs of funnel shifter 300 are connected, five to the five lines of "ALU" bus 222, and one to "CO" line 262. Finally, the funnel shifter 300 carry input is connected to "MSL/LSL*" line 264; and, the 16 funnel shifter data outputs are connected each output to the respective line of a 16-line bus 310. Funnel shifter 300, which is illustrated in greater detail in FIG. 2, function as follows:

| C0 | ALU4 | FUNNEL FUNCTION |
|---|---|---|
| 0 | 0 | Shift R up logical and fill with S |
| 0 | 1 | Shift S up logical and fill with R |
| 1 | 0 | Rotate R |
| 1 | 1 | Merge R, S, and F: rotate left R and merge into F using S as a mask, | and

| ALU3 | ALU2 | ALU1 | ALU0 | SHIFT POSITIONS |
|---|---|---|---|---|
| 0 | 0 | 0 | 0 | No shift |
| 0 | 0 | 0 | 1 | Shift left by 1 |
| 0 | 0 | 1 | 0 | Shift left by 2 |
| 0 | 0 | 1 | 1 | Shift left by 3 |
| 0 | 1 | 0 | 0 | Shift left by 4 |
| 0 | 1 | 0 | 1 | Shift left by 5 |
| 0 | 1 | 1 | 0 | Shift left by 6 |
| 0 | 1 | 1 | 1 | Shift left by 7 |
| 1 | 0 | 0 | 0 | Shift left by 8 |
| 1 | 0 | 0 | 1 | Shift left by 9 |
| 1 | 0 | 1 | 0 | Shift left by 10 |
| 1 | 0 | 1 | 1 | Shift left by 11 |
| 1 | 1 | 0 | 0 | Shift left by 12 |
| 1 | 1 | 0 | 1 | Shift left by 13 |
| 1 | 1 | 1 | 0 | Shift left by 14 |
| 1 | 1 | 1 | 1 | Shift left by 15. |

Merge logic unit 302 is configured with the set of 16 merge logic unit merge left "ML" data inputs connected, each input to the respective line of the 16 lines of bus 310, with the set of 16 merge logic unit merge mask "MM" data/control inputs connected, each input to the respective line of the 16 lines of "FB" bus 190, and with the set of 16 merge logic unit merge right "MR" data inputs connected, each input to the respective line of the 16 lines of "FB" bus 190. The 16 merge logic unit 302 data outputs are connected, each output to the respective line of a 16-line bus 314. Merge logic unit 302 is of the type which is described in the U.S. Pat. No. 4,760,517 of Michael J. Miller, Danh Le Ngoc, and John R. Mick. Employed in merge logic unit 302 (but not shown) are sixteen multiplexers, each of which has a special control portion. The multiplexers are each of the type which has a (single) ("ML") data input, that is connected to the respective line of the sixteen lines of bus 310, a single ("MM") data/control input, that is connected to the respective line of the sixteen lines of ("FB") bus 190, another (single) ("MR") data input, that is connected to the respective line of the sixteen lines of ("FB") bus 190, and a (single) data output, that is connected to the respective line of the sixteen lines of bus 314.

Multiplexer 304, which is similar to "A0" multiplexer 150, is configured, with the first set of 16 multiplexer (A) data inputs each connected to a respective one of the 16 lines of bus 310, with the second set of 16 multiplexer (B) data inputs each connected to a respective one of the 16 lines of bus 314, with the multiplexer select (control) inputs connected to lines of "ALU" bus 222, and with the set of 16 multiplexer data outputs each connected to a respective line of a 16-line bus 318.

In an output portion, arithmetic logic unit 100, additionally, includes a multiplexer 400, three, 16-bit, D-type, edge-triggered (flip-flop) registers, respectively designated 404, 406, and 408, two more multiplexers, respectively designated 412 and 414, a bit reversing unit 418, a rounding unit 422, a shifter 426, another multiplexer 430, and a tri-state output driving unit 434. Multiplexer 400 (also referred to as an output portion input register), which is similar to "A0" multiplexer 150, is configured, with the first set of 16 multiplexer (A) data inputs each connected to a respective one of the 16 lines of bus 270, with the second set of 16 multiplexer (B) data inputs each connected to a respective one of the 16 lines of bus 318, with the multiplexer select (control) inputs connected to lines of a 6-line "FSEL(0-5)" bus 440, and with the set of 16 multiplexer data outputs each connected to a respective line of a 16 line bus 444. Registers 404 ("F1"), 406 ("F2"), and 408 ("ACC"), which are each similar to "A0" multiplexer 140, are each configured, with the 16 register data inputs each connected to a respective line of the 16 lines of bus 444, with the register clock input connected to "CP" line 116, and with the register enable input connected to a line of a 2-line "FEN(01)" bus 448. The 16 register data outputs of "F1" register 404 are each connected to a respective line of a 16 line bus 450; the 16 register data outputs of "F1" register 406 are each connected to a respective line of a 16 line bus 454; and the 16 register data outputs of "ACC" register 408 are each connected to a respective line of a 16 line bus 458.

Multiplexer 412 (also referred to as an output portion feedback multiplexer), which, for clarity, is shown upside down, is similar to "B" multiplexer 204. Multiplexer 412 is configured, with (the first) one of the sets of 16 multiplexer data inputs connected, each input to a respective one of the 16 lines of bus 450, with (the second) one of the sets of 16 multiplexer data inputs connected, each input to a respective one of the 16 lines of bus 454, with (the third) one of the sets of 16 pl multiplexer data inputs connected to the 16 lines of bus 458, and with the remaining (fourth) one of the sets of 16 multiplexer data inputs connected to the 16 lines of a "YO" bus 462. The multiplexer 412 select (control) inputs are connected to lines of a 2-line "FBC(0-1)" bus 466; and, the set of 16 multiplexer data outputs are connected, each output to a respective line of "FB" bus 190.

Multiplexer 414 (also referred to as an output portion register multiplexer) is of the type which has three set of 16 data inputs, a number of select (control) inputs, and a set of 16 data outputs. Further, multiplexer 414 is of the type which is operative to develop at the 16 multiplexer data outputs, signals, the states of which correspond each to the state of a respective one of a set of 16 signals developed at a selected one of the three sets of 16 data inputs, the set of data inputs selected being determined by the state of signals developed on the multiplexer select (control) inputs. Multiplexer 414 is configured, with (the first) one of the sets of 16 multiplexer data inputs connected, each input to a respective one of the 16 lines of bus 450, with (the second) one of the sets of 16 multiplexer data inputs connected, each input to a respective one of the 16 lines of bus 444, with (the third) one of the sets of 16 multiplexer data inputs connected, each input to a respective one of the 16 lines of bus 454, with the multiplexer select (control) inputs connected to lines of "FSEL" bus 440, and with the set of 16 multiplexer data outputs connected, each output to a respective line of a 16-line bus 468.

Bit reversing unit 418 is configured, with the set of 16 bit reversing unit data inputs connected, each input to a respective one of the 16 lines of bus 466, with the control (select) inputs connected to lines of "FSEL" bus 440, with a bit reversing unit control input connected to "MSL/LSL*" line 264, and with the set of 16 bit reversing unit data outputs connected, each output to a respective line of a 16-line bus 470. For "bit-reverse addressing" bit reversing unit 418 is responsive to the state of the "FSEL" bus 440 signals and operative to couple the bus 466 signals to bus 470 so as to re-mapping the signals as follows:

| In a 10-bit mode: | | |
| --- | --- | --- |
| Bus 466 Bit 0 | → | Bus 470 Bit 9 |
| Bus 466 Bit 1 | → | Bus 470 Bit 8 |
| Bus 466 Bit 2 | → | Bus 470 Bit 7 |
| Bus 466 Bit 3 | → | Bus 470 Bit 6 |
| Bus 466 Bit 4 | → | Bus 470 Bit 5 |
| Bus 466 Bit 5 | → | Bus 470 Bit 4 |
| Bus 466 Bit 6 | → | Bus 470 Bit 3 |
| Bus 466 Bit 7 | → | Bus 470 Bit 2 |
| Bus 466 Bit 8 | → | Bus 470 Bit 1 |
| Bus 466 Bit 9 | → | Bus 470 Bit 0 |
| Bus 466 Bit 10 | → | Bus 470 Bit 10 |
| Bus 466 Bit 11 | → | Bus 470 Bit 11 |
| Bus 466 Bit 12 | → | Bus 470 Bit 12 |
| Bus 466 Bit 13 | → | Bus 470 Bit 13 |
| Bus 466 Bit 14 | → | Bus 470 Bit 14 |
| Bus 466 Bit 15 | → | Bus 470 Bit 15 |
| In a 12-bit mode: | | |
| Bus 466 Bit 0 | → | Bus 470 Bit 11 |
| Bus 466 Bit 1 | → | Bus 470 Bit 10 |
| Bus 466 Bit 2 | → | Bus 470 Bit 9 |
| Bus 466 Bit 3 | → | Bus 470 Bit 8 |
| Bus 466 Bit 4 | → | Bus 470 Bit 7 |
| Bus 466 Bit 5 | → | Bus 470 Bit 6 |
| Bus 466 Bit 6 | → | Bus 470 Bit 5 |
| Bus 466 Bit 7 | → | Bus 470 Bit 4 |
| Bus 466 Bit 8 | → | Bus 470 Bit 3 |
| Bus 466 Bit 9 | → | Bus 470 Bit 2 |
| Bus 466 Bit 10 | → | Bus 470 Bit 1 |
| Bus 466 Bit 11 | → | Bus 470 Bit 0 |
| Bus 466 Bit 12 | → | Bus 470 Bit 12 |
| Bus 466 Bit 13 | → | Bus 470 Bit 13 |
| Bus 466 Bit 14 | → | Bus 470 Bit 14 |
| Bus 466 Bit 15 | → | Bus 470 Bit 15 |
| In a 14-bit mode: | | |
| Bus 466 Bit 0 | → | Bus 470 Bit 13 |
| Bus 466 Bit 1 | → | Bus 470 Bit 12 |
| Bus 466 Bit 2 | → | Bus 470 Bit 11 |
| Bus 466 Bit 3 | → | Bus 470 Bit 10 |
| Bus 466 Bit 4 | → | Bus 470 Bit 9 |
| Bus 466 Bit 5 | → | Bus 470 Bit 8 |
| Bus 466 Bit 6 | → | Bus 470 Bit 7 |
| Bus 466 Bit 7 | → | Bus 470 Bit 6 |
| Bus 466 Bit 8 | → | Bus 470 Bit 5 |
| Bus 466 Bit 9 | → | Bus 470 Bit 4 |
| Bus 466 Bit 10 | → | Bus 470 Bit 3 |
| Bus 466 Bit 11 | → | Bus 470 Bit 2 |
| Bus 466 Bit 12 | → | Bus 470 Bit 1 |
| Bus 466 Bit 13 | → | Bus 470 Bit 0 |
| Bus 466 Bit 14 | → | Bus 470 Bit 14 |
| Bus 466 Bit 15 | → | Bus 470 Bit 15 |
| And, in a 16-bit mode: | | |
| Bus 466 Bit 0 | → | Bus 470 Bit 15 |
| Bus 466 Bit 1 | → | Bus 470 Bit 14 |
| Bus 466 Bit 2 | → | Bus 470 Bit 13 |
| Bus 466 Bit 3 | → | Bus 470 Bit 12 |
| Bus 466 Bit 4 | → | Bus 470 Bit 11 |
| Bus 466 Bit 5 | → | Bus 470 Bit 10 |
| Bus 466 Bit 6 | → | Bus 470 Bit 9 |
| Bus 466 Bit 7 | → | Bus 470 Bit 8 |
| Bus 466 Bit 8 | → | Bus 470 Bit 7 |
| Bus 466 Bit 9 | → | Bus 470 Bit 6 |
| Bus 466 Bit 10 | → | Bus 470 Bit 5 |
| Bus 466 Bit 11 | → | Bus 470 Bit 4 |
| Bus 466 Bit 12 | → | Bus 470 Bit 3 |
| Bus 466 Bit 13 | → | Bus 470 Bit 2 |
| Bus 466 Bit 14 | → | Bus 470 Bit 1 |
| Bus 466 Bit 15 | → | Bus 470 Bit 0. |

For this purpose, bit reversing unit 418 has a multiplexer (not shown), which is similar to multiplexer "B" 204. The bit reversing unit 418 multiplexer is configured, with the four sets of 16 multiplexer data inputs (all) connected to bus 466, with the multiplexer select (control) inputs connected to the lines of "FSEL" bus 444, and with the set of 16 multiplexer data outputs connected, each output to a respective line of bus 470. Each input of the first set of multiplexer inputs is connected to a line of bus 466 chosen to re-mapping the bus 466 signals so as to provide the 10-bit mode pattern; each input of the second set of multiplexer inputs is each connected to a line of bus 466 chosen to re-mapping the bus 466 signals so as to provide the 12-bit mode pattern; to provide the 14-bit pattern, each input of the third set of multiplexer inputs is connected to the appropriate line of bus 466; and, each input of the fourth set of multiplexer inputs is connected to a line of bus 466 chosen to re-mapping the bus 466 signals so as to provide the 16-bit mode pattern.

Rounding unit 422 is configured, with the set of 16 rounding unit data inputs connected, each input to a respective one of the 16 lines of bus 466, with the rounding unit control (select) inputs connected to lines of "FSEL" bus 440, with the rounding unit borrow input connected to a "SIOO" line 474, with the rounding unit control input connected to "MSL/LSL*" line 264, with the rounding unit carry output connected to a "SIO16" line 478, and with the set of 16 rounding unit data outputs connected, each output to a respective line of a 16-line bus 474. In a stand alone mode, and in a 32-bit mode in which rounding unit 440 is in the most significant slice, rounding unit is operative to increment by one the binary number represented by the state of the signals developed on bus 466 when a signal externally developed on "SIOO" line 474 has a high logic level ("1"), and to leave the number unchanged otherwise (when the "SIOO" line 474 signal has a low logic level ("0")). In the 32-bit mode when rounding unit 440 is in the least significant slice, the rounding unit is operative to round the binary number represented by the state of the signals developed on bus 466 from bit 13 into bit 14 or round from bit 14 into bit 15, as selected by the state of signals externally developed on the lines of "FSEL" bus 440, and to develop a suitable carry signal on "SIO16" line 478.

Shifter 426 is configured, with the set of 16 shifter data inputs connected, each input to a respective one of the 16 lines of bus 466, with the shifter control (select) inputs connected to lines of "FSEL" bus 440, with the other shifter control input connected to "MSL/LSL*" line 264, with the shifter bit 16 (left end) shift input/output connected to "SIO16" line 478, with the shifter bit 0 (right end) shift input/output connected to "SIOO" line 474, and with the set of 16 shifter data outputs connected, each output to a respective line of a 16-line bus 478. Responsive to the state of signals externally developed on "FSEL" bus 440 and "MSL/LSL*" line 264, shifter 426 is operative to shift the bits of the binary number represented by the signals developed on bus 466 up logically, down logically, up arithmetically, or down arithmetically.

Multiplexer 430 (also referred to as an output portion output multiplexer), which is similar to "B" multiplexer 204, is configured, with (the first) one of the sets of 16 multiplexer data inputs connected, each input to a respective one of the 16 lines of bus 470, with (the second) one of the sets of 16 multiplexer data inputs connected, each input to a respective one of the 16 lines of bus 466, with (the third) one of the sets of 16 multiplexer data inputs connected to the 16 lines of bus 474, and with the remaining (fourth) one of the sets of 16 multiplexer data inputs connected to the 16 lines of bus 478. The multiplexer 430 select (control) inputs are connected to lines of "FSEL" bus 440; and, the set of 16 multiplexer data outputs are connected, each output to a respective line of A 16-line bus 482.

Finally, tri-state output driver unit 434 is configured, with the set of 16 unit data inputs connected, each input to a respective one of the 16 lines of bus 482, with the unit output-enable input connected to a "OEA" line 486, and with the set of 16 unit data outputs connected, each output to a respective line of "YO" bus 462.

The arithmetic logic unit 100 output portion is responsive to signals externally developed on "FSEL" bus 440 and operative to develop the "YO" bus 462 signals as follows: F.

| "FSEL" Bus 440 Signals | "YO" Bus 462 Selections | |
|---|---|---|
| | Most Significant Slice | |
| 4 3 2 1 0 | (Or Stand Alone) | Least Significant Slice |
| 0 0 0 0 0 | Pass F | Pass F |
| 0 0 0 0 1 | Pass Reg. F1 | Pass Reg. F1 |
| 0 0 0 1 0 | Pass Reg. F2 | Pass Reg. F2 |
| 0 0 0 1 1 | Inc. Reg. F2 With SI0 | Round Reg. F2 Bit 15 |
| 0 0 1 0 0 | Inc. F With SI0 | Round F Bit 15 |
| 0 0 1 0 1 | Inc. F With SI0 | Round F Bit 14 |
| 0 0 1 1 0 | Inc. Reg. F1 With SI0 | Round Reg. F1 Bit 15 |
| 0 0 1 1 1 | Inc. Reg. F1 With SI0 | Round Reg. F1 Bit 14 |
| 0 1 0 0 0 | Shift F Up Log. | Shift F Up Log. |
| 0 1 0 0 1 | Shift F Down Log. And Fill SI016 | Shift F Down Log. And Fill SI016 |
| 0 1 0 1 0 | Shift F Up Arith. And Fill SI00 | Shift F Up Log. And Fill SI00 |
| 0 1 0 1 1 | Shift F Down And Sign-Ext. | Shift F Down Log. And Fill SI016 |
| 0 1 1 0 0 | Shift Reg. F1 Up Log. And Fill SI00 | Shift Reg. F1 Up Log. And Fill SI00 |
| 0 1 1 0 1 | Shift Reg. F1 Down Log. And Fill SI016 | Shift Reg. F1 Down Log. And Fill SI016 |
| 0 1 1 1 0 | Shift Reg. F1 Up Arith. And Fill SI00 | Shift Reg. F1 Up Log. And Fill SI00 |
| 0 1 1 1 1 | Shift Reg. F1 Down And Sign-Ext. | Shift Reg. F1 Down Log. And Fill SI016 |
| 1 0 0 0 0 | Shift Reg. F2 Up Log. And Fill SI00 | Shift Reg. F2 Up Log. And Fill SI00 |
| 1 0 0 0 1 | Shift Reg. F2 Down Log. And Fill SI016 | Shift Reg. F2 Down Log. And Fill SI016 |
| 1 0 0 1 0 | Shift Reg. F2 Up Arith. And Fill SI00 | Shift Reg. F2 Up Log. And Fill SI00 |
| 1 0 0 1 1 | Shift Reg. F2 Down And Sign-Ext. | Shift Reg. F2 Down Log. And Fill SI016 |
| 1 0 1 0 0 | Bit-Reverse F Bits 0-9 | Bit-Reverse F Bits 0-9 |
| 1 0 1 0 1 | Bit-Reverse F Bits 0-11 | Bit-Reverse F Bits 0-11 |
| 1 0 1 1 0 | Bit-Reverse F Bits 0-13 | Bit-Reverse F Bits 0-13 |
| 1 0 1 1 1 | Bit-Reverse F Bits 0-15 | Bit-Reverse F Bits 0-15 |
| 1 1 0 0 0 | Bit-Reverse Reg. F1 Bits 0-9 | Bit-Reverse Reg. F1 Bits 0-9 |
| 1 1 0 0 1 | Bit-Reverse Reg. F1 Bits 0-11 | Bit-Reverse Reg. F1 Bits 0-11 |
| 1 1 0 1 0 | Bit-Reverse Reg. F1 Bits 0-13 | Bit-Reverse Reg. F1 Bits 0-13 |
| 1 1 0 1 1 | Bit-Reverse Reg. F1 Bits 0-15 | Bit-Reverse Reg. F1 Bits 0-15 |
| 1 1 1 0 0 | Bit-Reverse Reg. F2 Bits 0-9 | Bit-Reverse Reg. F2 Bits 0-9 |
| 1 1 1 0 1 | Bit-Reverse Reg. F2 Bits 0-11 | Bit-Reverse Reg. F2 Bits 0-11 |
| 1 1 1 1 0 | Bit-Reverse Reg. F2 Bits 0-13 | Bit-Reverse Reg. F2 Bits 0-13 |
| 1 1 1 1 1 | Bit-Reverse Reg. F2 Bits 0-15 | Bit-Reverse Reg. F2 Bits 0-15. |

In the presently preferred embodiment, the components of arithmetic logic unit 100 are all integrated into a single device using CMOS technology.

It is contemplated that after having read the preceding disclosure, certain alterations and modifications of the present invention will no doubt become apparent to those skilled in the art. It is therefor intended that the following claims be interpreted to cover all such alterations and modifications as fall within the true spirit and scope of the invention.

What is claimed is:

1. An arithmetic logic system comprising in combination:

a DA bus;

a DB bus;

an R bus;

an S bus;

a FB bus;

a YO bus;

pipeline register means including a set of data inputs connected to said DA bus and a set of data outputs connected to said R bus;

a B register including a set of data inputs connected to said DB bus and a set of data outputs;

a B multiplexer including a first set of data inputs connected to said DA bus, a second set of data inputs connected to said DB bus, a third set of data inputs connected to said B register set of data outputs, a fourth set of data inputs connected to said FB bus, and a set of data outputs connected to said S bus;

an arithmetic logic unit means including a first set of data inputs coupled to said R bus, a second set of data inputs coupled to said S bus, and a set of data outputs;

a funnel shifter including a first set of data inputs connected to said R bus, a second set of data inputs connected to said S bus, and a set of data outputs;

a merge logic unit including a set of merge left data inputs connected to said funnel shifter set of data outputs, a set of merge mask data/control inputs connected to said S bus, a set of merge right data inputs connected to said FB bus, and a set of data outputs;

a funnel shifter/merge logic unit multiplexer including a first set of data inputs connected to said funnel shifter set of data outputs, a second set of data inputs connected to said merge logic unit set of data outputs, and a set of data outputs;

an output means connected to said arithmetic logic unit means set of data outputs, to said funnel shifter/merge logic unit multiplexer set of data outputs, to said FB bus, and to said YO bus.

2. An arithmetic logic system as recited in claim 1 wherein said output means includes, an output means input multiplexer having a first set of data inputs connected to said arithmetic logic unit means set of data outputs, a second set of data inputs connected to said funnel shifter/merge logic unit multiplexer set of data outputs, and a set of data outputs;

a F1 register having a set of data inputs connected to said output means input multiplexer set of data outputs, and a set of data outputs; and an output means feedback multiplexer having a first set of data inputs connected to said F1 register set of data outputs, a second set of data inputs connected to said YO bus, and a set of data outputs connected to said FB bus.

3. An arithmetic logic system as recited in claim 2 wherein said output means further including, an output means register multiplexer having a first set of data inputs connected to said F1 register set of data outputs, a second set of data inputs connected to said output means input multiplexer set of data outputs, and a set of data outputs;

a bit reversing unit having a set of data inputs connected to said output means register multiplexer set of data outputs, and a set of data outputs; and an output means output multiplexer having a first set of data inputs connected to said bit reversing unit set of data outputs, a second set of data inputs connected to said output means register multiplexer set of data outputs, and a set of data outputs coupled to said YO bus.

4. An arithmetic logic system as recited in claim 1 wherein said pipeline register means includes, an A0 register having a set of data inputs connected to said DA bus and a set of data outputs, an A0 multiplexer having a first set of data inputs connected to said A0 register set of data outputs, a second set of data inputs connected to said DA bus, and a set of data outputs, an A1 register having a set of data inputs connected to said A0 multiplexer set of data outputs, and a set of data outputs, an A1 multiplexer having a first set of data inputs connected to said A1 register set of data outputs, a second set of data inputs connected to said DA bus, and a set of data outputs.

an A2 register having a set of data inputs connected to said A1 multiplexer set of data outputs, and a set of data outputs, an A2 multiplexer having a first set of data inputs connected to said A2 register set of data outputs, a second set of data inputs connected to said DA bus, and a set of data outputs, an A3 register having a set of data inputs connected to said A2 multiplexer set of data outputs, and a set of data outputs, an A3 multiplexer having a first set of data inputs connected to said A3 register set of data outputs, a second set of data inputs connected to said DA bus, and a set of data outputs connected to said R bus.

5. An arithmetic logic system as recited in claim 4 wherein said output means includes, an output means input multiplexer having a first set of data inputs connected to said arithmetic logic unit means set of data outputs, a second set of data inputs connected to said funnel shifter/merge logic unit multiplexer set of data outputs, and a set of data outputs;

an F1 register having a set of data inputs connected to said output means input multiplexer set of data outputs, and a set of data outputs; and an output means feedback multiplexer having a first set of data inputs connected to said F1 register set of data outputs, a second set of data inputs connected to said YO bus, and a set of data outputs connected to said Fb bus.

6. An arithmetic logic system as recited in claim 5 wherein said output means further includes, an output portion means register multiplexer having a first set of data inputs connected to said F1 register set of data outputs, a second set of data inputs connected to said output means input multiplexer set of data outputs, and a set of data outputs;

a bit reversing unit having a set of data inputs connected to said output means register multiplexer set of data outputs, and a set of data outputs, and an output means output multiplexer having a first set of data inputs connected to said bit reversing unit set of data outputs, a second set of data inputs connected to said output means register multiplexer set of data outputs, and a set of data outputs coupled to said YO bus.

7. An arithmetic logic system as recited in claim 6 wherein said output means register multiplexer further has a third set of data inputs, and a fourth set of data inputs and wherein said output means further includes, an F2 register having a set of data inputs connected to said output means input multiplexer set of data outputs, and a set of data outputs connected to said output means register multiplexer third set of data inputs, and an ACC register having a set of data inputs connected to said output means input multiplexer set of data outputs, and a set of data outputs connected to said output means register multiplexer fourth set of data inputs.

8. An arithmetic logic system as recited in claim 6 wherein said output means output multiplexer further has a third set of data inputs and a fourth set of data inputs, and wherein said output means further includes,
a rounding unit having a set of data inputs connected to said output means register multiplexer set of data outputs, and a set of data outputs connected to said output means output multiplexer third set of data inputs, and
a shifter having a set of data inputs connected to said output means register multiplexer set of data outputs, and a set of data outputs connected to said output means output multiplexer fourth set of data inputs.

9. An arithmetic logic system as recited in claim 8 wherein said output means register multiplexer further has a third set of data inputs and a fourth set of data inputs, and wherein said output means further includes,
an F2 register having a set of data inputs connected to said output means input multiplexer set of data outputs, and a set of data outputs connected to said output means register multiplexer third set of data inputs, and
an ACC register having a set of data inputs connected to said output means input multiplexer set of data outputs, and a set of data outputs connected to said output means register multipelxer fourth set of data inputs.

* * * * *

UNITED STATES PATENT AND TRADEMARK OFFICE
CERTIFICATE OF CORRECTION

PATENT NO. : 4,931,974

DATED : June 5, 1990

INVENTOR(S) : Danh Le Ngoc and John R. Mick

It is certified that error appears in the above—identified patent and that said Letters Patent is hereby corrected as shown below:

Cover page of Patent - under UNITED STATES PATENT [19] name inventors should read "Le Ngoc, et al." and not "Ngoc, et al.".

Signed and Sealed this

Twenty-first Day of May, 1991

Attest:

HARRY F. MANBECK, JR.

Attesting Officer

Commissioner of Patents and Trademarks